United States Patent
Wilkins

[19]

[11] Patent Number: 5,870,854
[45] Date of Patent: Feb. 16, 1999

[54] GELATIN-PLASTIC FOAM SEED GERMINATION AND PLANT GROWTH METHOD

[76] Inventor: Judd R. Wilkins, 281 Littleton Quarter, Williamsburg, Va. 23185

[21] Appl. No.: 943,176

[22] Filed: Oct. 3, 1997

[51] Int. Cl.$^6$ ................................................. A01G 31/00
[52] U.S. Cl. ................................................. 47/58; 47/64
[58] Field of Search ............................. 47/58, 64, 65.5, 47/85, 904; 119/51.03

[56] References Cited

U.S. PATENT DOCUMENTS

| | | | |
|---|---|---|---|
| 1,624,504 | 4/1927 | Pfarr | 47/904 |
| 3,920,144 | 11/1975 | Callen | 47/85 |
| 3,932,319 | 1/1976 | Clendinning | 47/74 |
| 4,106,235 | 8/1978 | Smith | 47/58 |
| 4,175,355 | 11/1979 | Dedolph | 47/64 |
| 4,789,584 | 12/1988 | Perrin | 47/64 |
| 5,155,931 | 10/1992 | Vanteenkiste | 47/64 |
| 5,207,733 | 5/1993 | Perrin | 47/64 |
| 5,218,783 | 6/1993 | Langezaal | 47/64 |
| 5,224,292 | 7/1993 | Anton | 47/64 |
| 5,352,253 | 10/1994 | Gritching | 47/58 |
| 5,564,224 | 10/1996 | Carlson et al. | 47/58 |
| 5,606,933 | 3/1997 | Wilkins | 119/51.03 |
| 5,699,752 | 12/1997 | Wilkins | 119/51.03 |

*Primary Examiner*—Michael J. Carone
*Assistant Examiner*—Elizabeth Shaw
*Attorney, Agent, or Firm*—Wallace J. Nelson

[57] ABSTRACT

A melted gelatin (specific example agar) is employed to saturate a plastic foam disk and, after solidification, to provide a medium to promote seed germination and plant growth. After germination, the seed and gelatin saturated disk are transferred to a growth container for additional plant growth prior to transfer of the plant to soil. The growth containers are divided into upper and lower chambers by transverse bamboo rods (FIGS. 3 and 5) or piano wire lengths (FIG. 4) with the gelatin saturated disk and seedling(s) placed in the upper chamber and the lower chamber provided with water, water containing plant food, agar, or nutrient gelatin.

20 Claims, 4 Drawing Sheets

GELATIN-PLASTIC FOAM SEED GERMINATION AND PLANT GROWTH METHOD

FIELD OF THE INVENTION

This invention relates to seed germination and plant growth, in general, and relates specifically to a soil-less seed germination and plant growth process.

BACKGROUND OF THE INVENTION

The conventional method for growing plants from seeds involves spreading the seeds over commercial seed-growing potting soil in a shallow tray or pot. A fine layer of the potting soil is spread over the seeds to hold them in place. In order to retain moisture, trays are covered with glass and newspaper, or the pots are provided with individual plastic bags held in place thereover with a rubber band. The soil is moistened and germination takes place by placing the trays or pots in a warm environment, such as room temperature of 70° F. to 80° F. After sprouting begins, and the plants are large enough to handle, they are transferred to larger pots or planted in the garden soil.

Another method for growing plants is hydroculture (also known as hydroponics) with the plant roots immersed in water containing necessary plant food. This method replaces potting mixtures or soil and is often referred to as "soil-less" cultivation. In hydroculture, plants are held in an upright position through the use of aggregates, i.e., inert granular material formed of pea-gravel, crushed granite chips, lignite, and the like. The present invention is concerned with a "soil-less" cultivation process that includes seed germination and plant growth.

It is an object of the present invention to provide a soil-less cultivation method from seed germination to plant growth.

Another object of the present invention is to utilize the unique qualities of a gelatin, such as agar, to initiate and support seed germination, allow visualization of the germination process, and aid in plant growth.

A further object of the present invention is to employ the porous qualities of plastic foam as a base for plant growth by allowing root penetration and development and as a reservoir for agar retention and moisture.

Another object of the present invention is to combine agar with plastic foam as an easy to use and inexpensive method for the germination and growth of a wide variety of household plants, herbs, and vegetables.

SUMMARY OF THE INVENTION

According to the present invention, the foregoing and additional objects are attained by combining a gelatin, such as agar, with porous plastic foam as a workable substitute for conventional seed germination and plant growth methods. Agar, a complex of polysaccharides and minerals, is extracted from algae and, for years, has served as a semisolid base for bacterial growth. By definition, agar is a gel and chemically a colloid, i.e., a suspension of finely divided particles in the size range of 50 to 100,000 angstroms. A 0.20–0.50 percent solution of agar initiates and supports seed germination which can be observed when tested in a Petri dish. In the specific examples described herein, a 0.25 percent solution of agar is employed to initiate and support seed germination and plant growth.

Briefly, germination begins with a split in the seed coat, with the initial radicle moving in a downward gravity oriented direction, followed by an upward growth movement leading to a stem and two cotyledons. This phenomenon is referred to as sprouting. When porous plastic foam is saturated with melted agar and allowed to gel, seeds placed on the surface germinate and sprout, as described. When growth has reached the sprouting stage, lids are removed from the Petri dishes and growth exposed to ambient conditions. In a growth chamber, the foam containing agar is placed on a support rack formed of wire or bamboo rods in the larger container. The space below the foam may contain water, water mixed with plant food, or semisolid agar with plant foods. As growth continues, roots penetrate the plastic foam and can be seen protruding from the bottom of the plastic foam. As the stem increases in length and additional leaves are formed, the vertical stems of the plants are supported with bamboo stakes. The present invention is ideally suited for class room teaching and demonstrations.

BRIEF DESCRIPTION OF THE DRAWINGS

A more complete appreciation of the invention and many of the attendant advantages thereof will be more readily apparent as the same becomes better understood with reference to the accompanying drawings wherein.

MATERIALS EMPLOYED IN THE PROCESS (a) one/half inch thickness polystyrene porous foam plastic (b) powdered agar (gelatin)

(c) plastic disposable Petri dishes w/covers (d) artificial light source (e) one pair kitchen tongs (f) small weight (g) liquid plant food (h) plastic growth containers (i) graduated measuring cup (j) measuring spoon

DETAILED DESCRIPTION

In the specific examples herein, three inch diameter disks were trimmed from one/half inch plastic polystyrene foam. Plastic polystyrene foam is available from fabric shops, such as the Piece Goods Shop Home Center, Williamsburg, Va. and is available in two-foot widths and thickness of ½, 1.0 and 2.0 inches. In a plastic measuring cup, a ¼ teaspoon of agar powder is added to 200 ml of water (about 0.25 percent) and placed in a microwave oven at the high setting for four minutes to dissolve the agar. The agar employed in the present invention was obtained from Difco Laboratories, Detroit, Mich. Other suitable agar is commercially available from a number of chemical and biological supply houses under various trade names. Although 0.25 percent agar solutions were employed in the specific examples described herein, seed germination and plant growth can also occur in agar concentrations of 0.20–0.50 percent.

Figure 1:
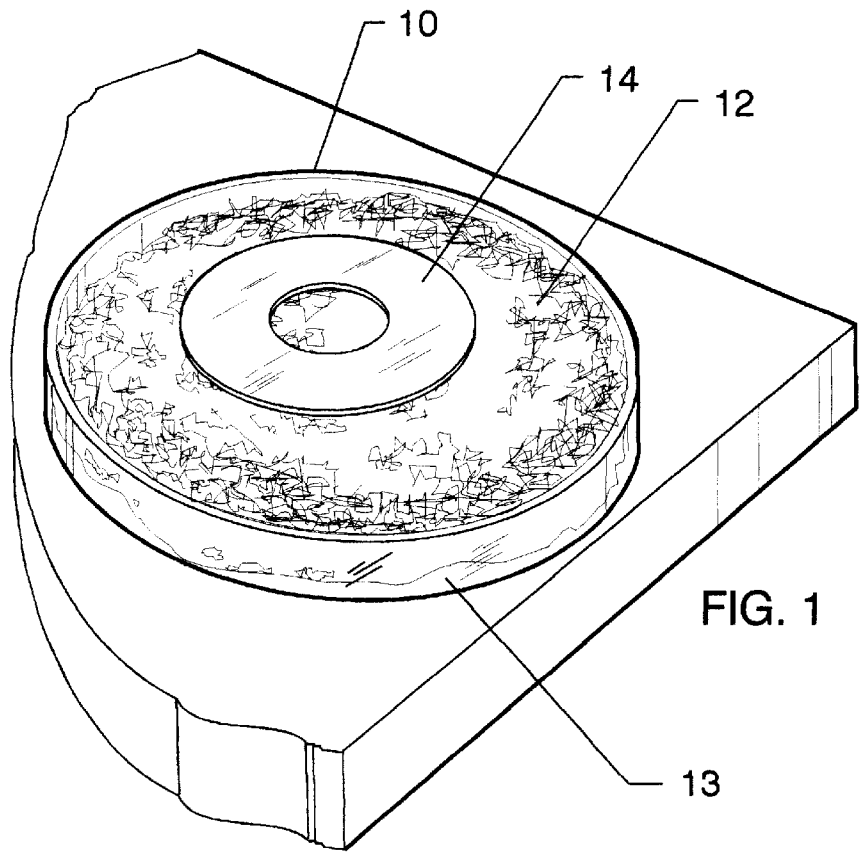
FIG. 1 is a schematic view of a Petri dish housing a weight retained, agar saturated, porous foam plastic disk, as employed in the process of the present invention.

Referring to the drawings, and more particularly to FIG. 1, a plastic disposable Petri 10 is schematically shown. Petri dish 10 contains an agar saturated, three inch diameter plastic foam disk 12, with a weight 14 disposed thereon to maintain the plastic foam disk in place. Initially, disk 12 was placed in the hot, melted agar 13 and vigorously probed with plastic kitchen tongs to expel entrapped air. Using the tongs (not illustrated) the agar saturated plastic disk 12 was transferred to Petri dish 10, weight 14 placed thereon to prevent movement while additional melted agar 13 was added to complete saturation of the plastic disk 12. Plastic disposable Petri dishes employed in the present invention were obtained from a supply house under the "Falcon" trade name. Weight 14, in the specific examples, was a one and one/half inch diameter metal washer. A cover was placed over the Petri dish 10 and the agar allowed to solidify at room temperature for two to three hours.

Figure 2:
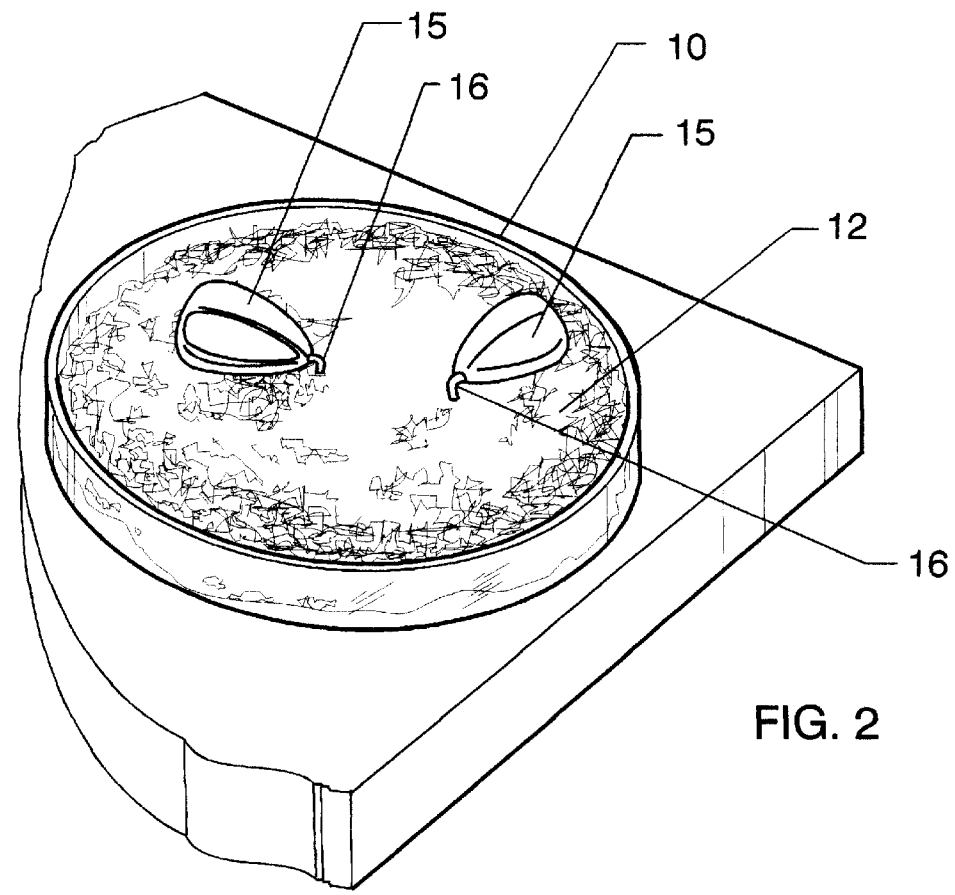
FIG. 2 is a schematic view similar to FIG. 1 illustrating seed germination of a pair of single seeds placed on the surface of the agar saturated porous foam plastic disk.

After removing the metal washer 14, and using the kitchen tongs, the agar saturated plastic disk was turned over, so that the smooth underside was face-up, and returned to the bottom portion of Petri dish 10 (FIG. 2). Seeds were then placed on the smooth agar surface, the lid returned, and the covered Petri dishes placed around the base of a desk lamp or under a General Electric "Gro & Sho Bright Stik" lamp used to promote plant growth indoors, as will be further explained hereinafter. Incubation of the Petri dishes was at room temperature with both the desk lamp and with the "Gro & Sho" lamp on a 12 hour on, 12 hour off cycle.

Referring to FIG. 2, a pair of single bean seeds are shown after germination with radicle development 16 on agar saturated disk 12.

Figure 3:
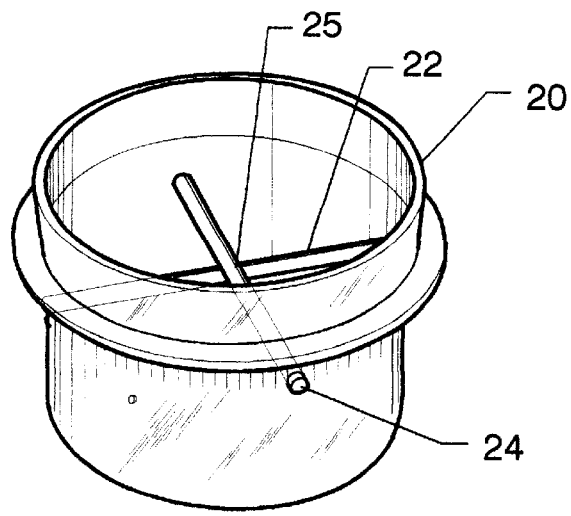
FIG. 3 is a schematic view of a growth container having a plastic disk horizontal support structure formed therein.

Referring now to FIG. 3, an open growth container for growing plants germinated from seeds in the Petri dishes 10 is illustrated and designated by reference numeral 20. A pair of crossed bamboo rod lengths 22,24 are fixed through the sidewall of container 20 and serve to divide container 20 into upper and lower compartments and to provide a support rack 25 for an agar saturated foam plastic disk 12 (FIG. 2) that has been employed to promote germination of seeds thereon, as will be further explained hereinafter.

Figure 4:
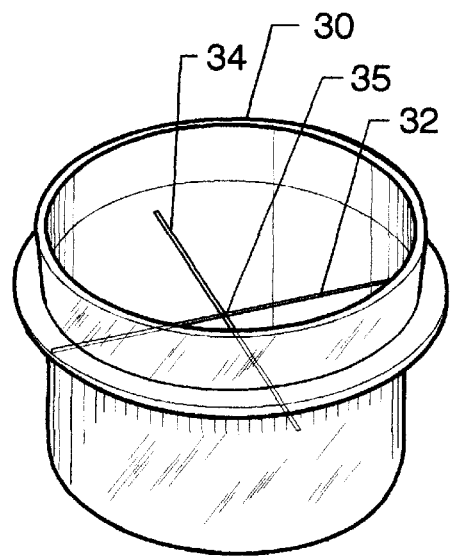
FIG. 4 is a schematic view of a growth container similar to FIG. 3 with a modified plastic disk support structure therein.

Referring now more particularly to FIG. 4, another open growth container for growing plants germinated from seeds in Petri dishes 10 is illustrated and designated by reference numeral 30. In this embodiment, a pair of piano wire lengths 32,34 are perpendicularly disposed in cross relationship and extend through the sidewall of growth container 30. Crossed wires 32,34 also serve to divide container 30 into upper and lower compartments and to provide a support rack 35 for an agar saturated foam plastic disk 12 (FIG. 2) that has been employed to promote germination of seeds thereon.

Figure 5:
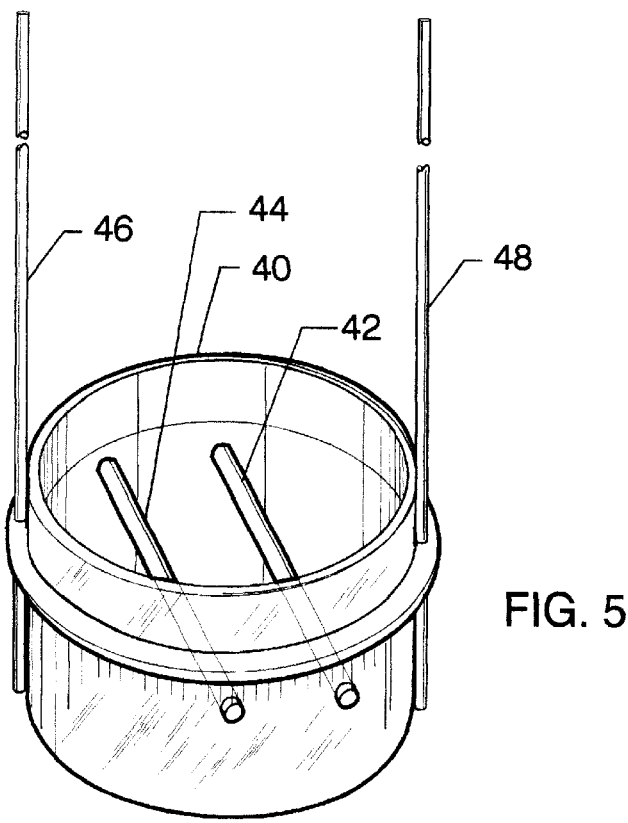
FIG. 5 is a schematic view of a growth container similar to FIGS. 3 and 4 and illustrating another plastic disk support structure and including vertical extensions, or stakes, for supporting the growth of plants.

Referring now to FIG. 5, another open growth container for growing plants germinated from seeds in Petri dishes 10 (FIG. 1) is illustrated and designated by reference numeral 40. In this embodiment, a pair of spaced bamboo rods 42,44 extend through and across container 40 adjacent the center diameter thereof to provide a support rack for an agar saturated foam plastic disk 12 (FIG. 2) that has been employed to promote seed germination thereon. In addition, container 40 is provided with a pair of diametrically opposed vertical bamboo stakes, or rods 46,48 fixed thereto to serve as vertical supports for young plants being grown in container 40, and as also will be further explained hereinafter.

Figure 6:
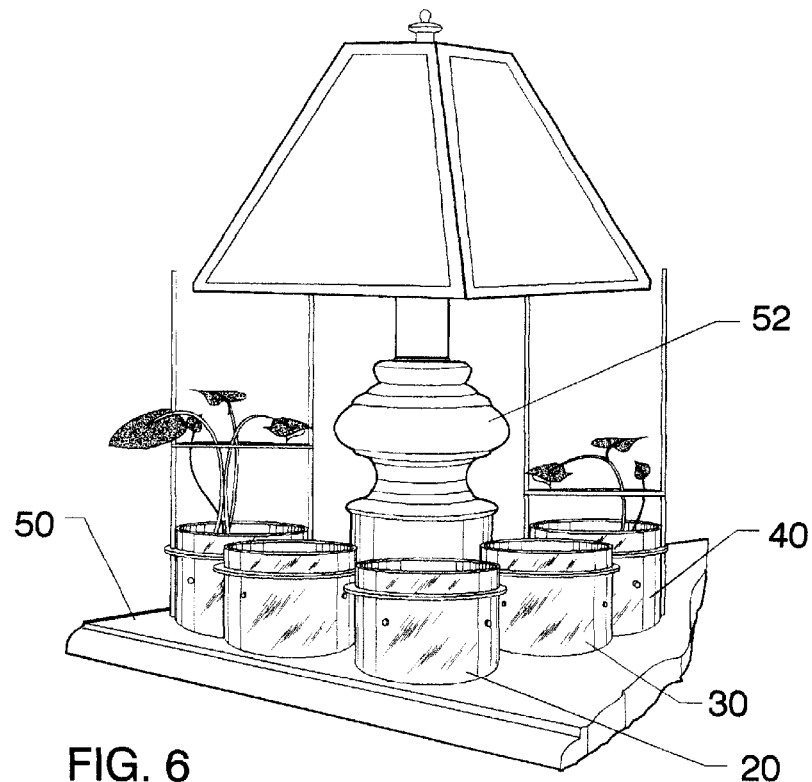
FIG. 6 is a schematic view of several growth containers with plant growth therein and disposed under an artificial light source.

Referring to FIG. 6, a plurality of open growth containers 20, 30 and 40 are shown disposed (at room temperature) on a surface 50 and under a table lamp 52. Lamp 52 is employed on a twelve hour on/twelve hour off cycle to promote germination while the seeds are on a agar saturated foam plastic disk 12 (FIG. 2), and to continue promoting plant growth once the germinated seeds and disk are transferred to the open growth containers. In the specific examples described herein, approximately 200 ml of water containing a small quantity of liquid plant food was placed in each of containers 20, 30 and 40 before the germinated seed covered plastic disk were transferred to the containers. In a specific embodiment, four drops of Schultz-Instant liquid plant food (manufactured by Schultz Co., St. Louis, Mo.) was employed as an aid to further plant growth.

Figure 7:
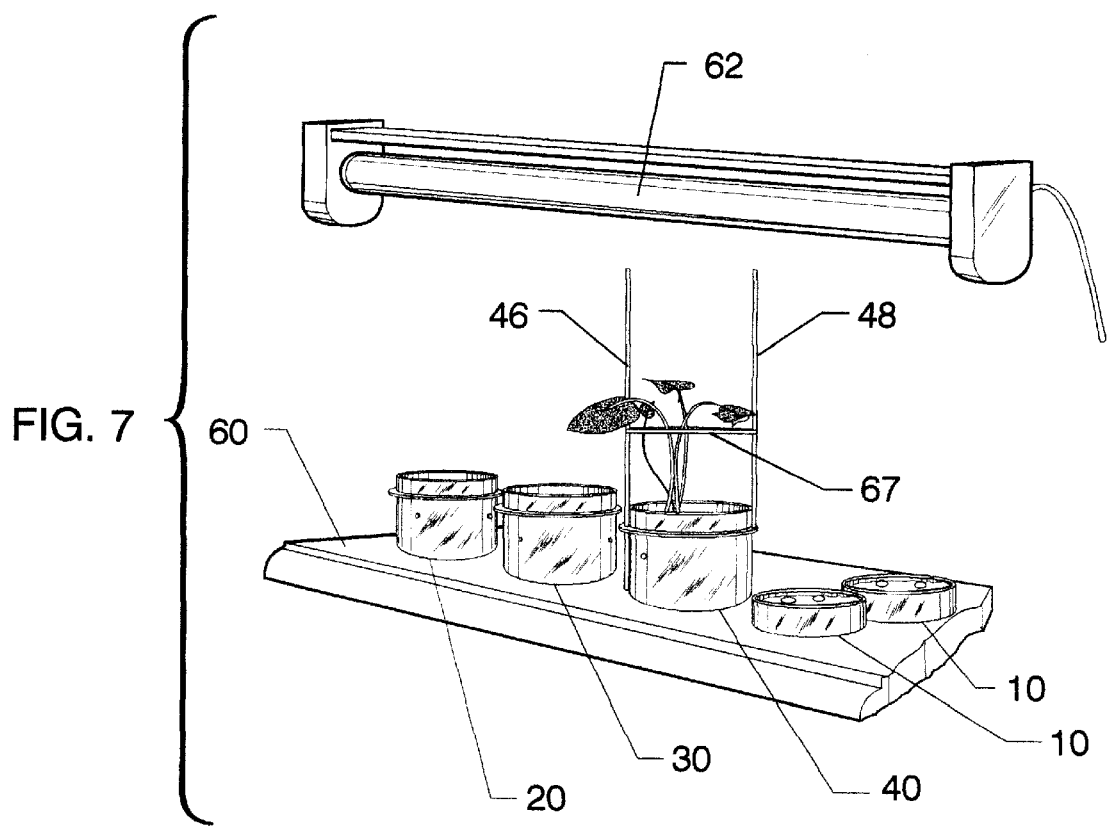
FIG. 7 is a schematic view of several growth containers with plant growth therein and several Petri dish germination containers similar to that shown in FIGS. 1 and 2, and disposed under another artificial light source.

Referring to FIG. 7, a plurality of growth containers 20, 30 and 40, and a plurality of Petri dishes 10 containing seeds and agar saturated plastic disks, are illustrated and shown on a support surface 60 and positioned under a "Gro & Sho" lamp 62 at room temperature.

Figure 8:
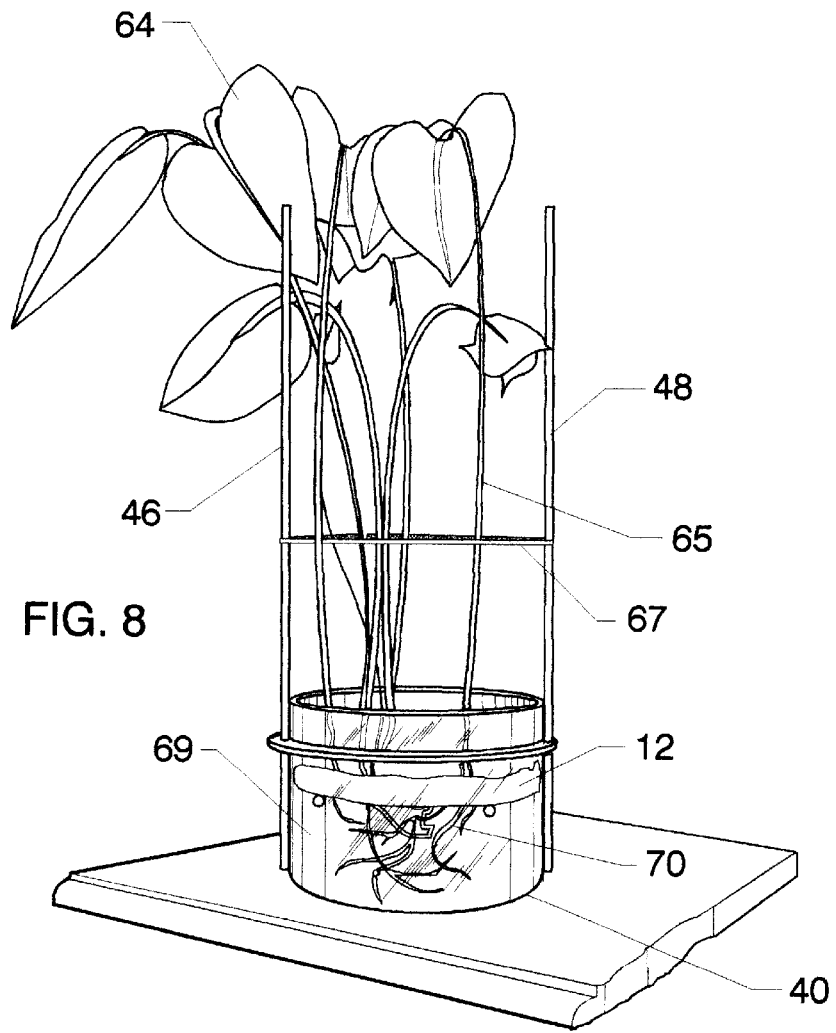
FIG. 8 is a schematic enlarged view of a vegetable plant after several days of growth in the growth container shown in FIG. 5.

Referring to FIG. 8, a growth container 40 is shown housing snap bean plants 64,65 after ten days from the date of germination. Plants 64,65 are supported by both vertical bamboo rods 46,48 and assisted by a retention wrap or cord 67. The agar saturated plastic foam disk 12 rests on the support rack (not designated) provided in container 40 and a quantity of liquid plant food 69 (as described hereinbefore) is disposed below the bamboo support rack to assist in the root growth 70 of plants 64,65. In this illustrated embodiment, plants 64,65 have reached sufficient maturity to be transplanted into a soil environment.

Figure 9:
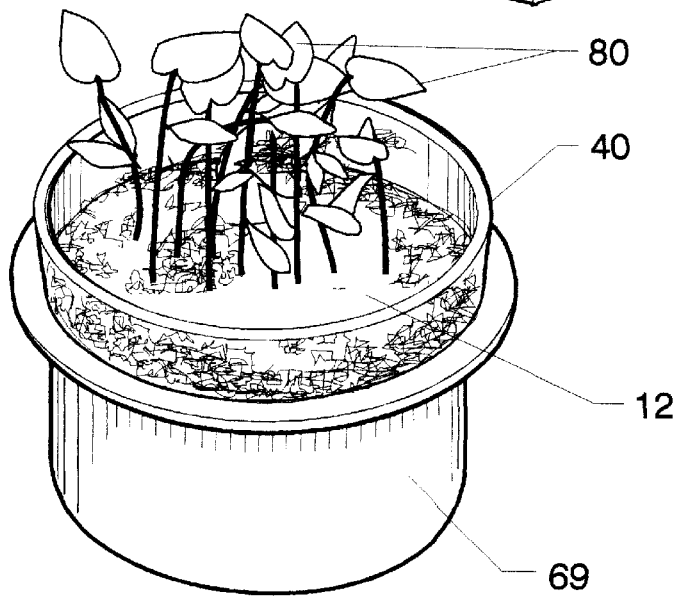
FIG. 9 is a schematic view similar to FIG. 8 illustrating another plant growth after several days of growth in a growth container as shown FIG. 3.

Referring now to FIG. 9, a growth container 40 is shown housing a plurality of Alyssum plants, generally designated by reference numeral 80, as seen seventeen days after the seeds thereof have been placed on agar saturated disk 12 in a Petri dish. As illustrated disk 12, with the plant growth, is transferred to growth container 40 before being transplanted into a soil environment.

Other seeds that have been successfully germinated and their germination periods include Coleus (10 days), Marigold (18 days), Sunflower (4 days), Zinnia (18 days), Cucumber (4 days) and Pumpkin (4 days).

The open containers 20, 30 and 40 described in the specific examples are Rubbermaid microwaveable "Servin Savers" and available from most grocery or department stores. The dimensions of each of these specific example containers are three and one/fourth inch diameter at the open end, a depth of two and three/fourths inches, with a volume of ten ounces and provided with a one/fourth inch lip (disposed nine/sixteenths of an inch from the open top) that extends around the container circumference.

Suitable sized holes (0.055 inch for the 0.055 inch diameter piano wire and 7/16 inch for the 7/16 inch diameter bamboo rods) were drilled three/eights of an inch below the lip to receive the piano wire or bamboo rods forming the respective support racks in the open containers, as described hereinabove. A drop of Duco cement sealed off the ends of each wire or rod protruding through the plastic container sidewall.

Two equally spaced bamboo stakes were inserted into two diametrically 7/64 inch holes drilled in the lip of these containers. Again, Duco cement was applied to each stake to insure firm binding to the container.

Although the present invention has been described relative to these specific examples, it is not so limited and any vegetable, flower or herb that is reproduced by seed germination is considered within the scope of the invention. Also, the invention is not limited to practice with agar for seed germination and any suitable gelatin containing suitable nutrients is considered within the scope of the invention. Also, it is to be understood that the specific materials employed in the process described herein are given by way of examples and are not to be deemed as exhaustive or exclusive. Thus, other features may be apparent to those skilled in the art in the light of the above teachings and may be employed in the process without departing from the spirit and scope of the appended Claims.

Thus, within the scope of the appended Claims, the invention may be practiced other than as specifically described herein.

What is claimed as new and desired to be secured by Letters Patent of the United States is:

1. A soil-less method of seed germination and plant growth comprising the steps of:
   providing a plastic foam disk;
   placing the plastic foam disk in a first open container;
   adding a weight to the top of the plastic foam disk to maintain the foam disk in the first container;
   adding melted gelatin to the first container sufficient to completely cover and saturate the plastic foam disk;
   covering the first open container and permitting the gelatin to solidify at room temperature;
   removing the covering from the open container and removing the weight from the solidified gelatin saturated plastic disk;
   turning the solidified gelatin saturated plastic disk over to expose a smooth gelatin surface and repositioning the plastic disk back into the open first container with the smooth surface exposed;
   depositing at least one seed on the smooth gelatin surface of the saturated plastic foam disk;
   again covering the first container having the seed on the gelatin saturated plastic foam disk;
   incubating the covered container housing the seed implanted gelatin saturated plastic foam disk at room temperature to promote germination of the seed.

2. The method of claim 1 wherein the step of incubating the covered container housing the seed implanted agar saturated plastic foam disk comprises exposing the covered container to a cyclic twelve hours artificial light and twelve hours darkness at room temperature.

3. The method of claim 1 wherein the step of depositing at least one seed on the smooth gelatin surface of the saturated plastic foam disk includes depositing multiple seeds on the smooth gelatin surface and the multiple seeds are selected from the group of seeds consisting of vegetable seeds, flower seeds and herb seeds.

4. The method of claim 1 including providing a second open container and wherein, after the at least one seed germinates, transferring the entire gelatin saturated foam plastic disk and germinated seed to the second open container to promote plant growth.

5. The method of claim 4 wherein the second open container is provided with a support rack separating the second open container into an upper compartment and a lower compartment.

6. The method of claim 5 wherein the support rack consists of two parallel spaced bamboo rods extending through the second open container sidewalls.

7. The method of claim 5 wherein the support rack consists of a pair of crossed bamboo rods disposed in a perpendicular relationship and each of the bamboo rods having ends that extend through the sidewall of the second open container.

8. The method of claim 5 wherein the support rack consists of a pair of crossed piano wire lengths disposed in a perpendicular relationship and each of the piano wire lengths having ends that extend through the sidewall of the second open container.

9. The method of claim 5 including the step of providing a liquid plant growth medium to the lower compartment of the second open container.

10. The method of claim 9 wherein the liquid plant growth medium is selected from the group of liquid plant growth mediums consisting of water, water containing liquid plant food, and a semi-solid agar suspension containing liquid plant food.

11. The method of claim 4 including a pair of vertical bamboo rods secured to, and extending upwardly from, the second open container and positioned in a diametrically disposed relationship to each other.

12. The method of claim 1 wherein the melted gelatin consists of melted agar in water.

13. A method of seed germination and plant growth comprising the steps of:
   providing a smooth gelatin surface on a gelatin saturated plastic foam disk;
   depositing at least one seed selected from the group of seed bearing plants consisting of vegetables, herbs and flowers on the smooth gelatin surface;
   exposing the gelatin saturated plastic foam disk to room temperature and artificial light conditions until the seed germinates;
   providing a plant growth container having a support rack formed therein dividing the container into upper and lower chambers;
   transferring the gelatin saturated plastic foam disk and germinated seed to the upper chamber of the growth container and onto the support rack formed in a growth container; and
   providing plant growth media in the lower chamber of the growth container.

14. The method of claim 13 wherein the support rack is formed of two bamboo rods extending through the plant growth container.

15. The method of claim 14 wherein the two bamboo rods forming the support rack are disposed in perpendicular relationship and each of the bamboo rods have ends that extend through the sidewall of the container.

16. The method of claim 13 wherein the two bamboo rods are disposed in spaced parallel relationship and each of the bamboo rods have ends that extend through the sidewall of the container.

17. The method of claim 13 wherein the support rack is formed of a pair of crossed piano wire lengths disposed in perpendicular relationship and each of the piano wire lengths having ends extending through the sidewall of the container.

18. The method of claim 13 wherein the gelatin is agar.

19. The method of claim 13 wherein the gelatin is formed of a 0.20–0.50 percent suspension of powered agar in water.

20. The method of claim 19 wherein the gelatin is formed of a 0.25 percent suspension of powered agar in water.

* * * * *